(12) United States Patent
Huijsing

(10) Patent No.: US 12,245,029 B2
(45) Date of Patent: Mar. 4, 2025

(54) AIRCRAFT INSERT NETWORK CONFIGURATION USING LED

(71) Applicant: B/E AEROSPACE, INC., Winston Salem, NC (US)

(72) Inventor: Hans Huijsing, Ijsselstein (NL)

(73) Assignee: B/E AEROSPACE, INC., Winston Salem, NC (US)

( * ) Notice: Subject to any disclaimer, the term of this patent is extended or adjusted under 35 U.S.C. 154(b) by 773 days.

(21) Appl. No.: 17/145,075

(22) Filed: Jan. 8, 2021

(65) Prior Publication Data
US 2022/0225090 A1 Jul. 14, 2022

(51) Int. Cl.
*H04L 29/06* (2006.01)
*H04W 12/06* (2021.01)
*H04W 76/14* (2018.01)
*H04W 84/12* (2009.01)

(52) U.S. Cl.
CPC .......... *H04W 12/06* (2013.01); *H04W 76/14* (2018.02); *H04W 84/12* (2013.01)

(58) Field of Classification Search
CPC ...... H04W 12/06; H04W 76/14; H04W 84/12
See application file for complete search history.

(56) References Cited

U.S. PATENT DOCUMENTS 9,607,257 B2   3/2017  Cha et al.
9,612,798 B2   4/2017  Huang et al.
2015/0195036 A1*  7/2015  Park .................... H04B 10/1149
                                                                    398/118
2016/0014820 A1*  1/2016  Dhanabalan ............ H04L 41/00
                                                                    455/41.1
2020/0015319 A1*  1/2020  Chen ..................... H04W 12/06
2020/0201801 A1   6/2020  Monnier et al.
2020/0408875 A1* 12/2020  Mai ......................... G01S 7/006

FOREIGN PATENT DOCUMENTS

JP         6260948 A     9/1994
KR       2006005102     1/2006

OTHER PUBLICATIONS

Extended European Search Report for European Patent Application No. EP22150794.0, dated May 18, 2022.
Annex to the Extended European Search Report for Application No. 22150794.0 dated Jul. 14, 2023.
European Patent Office, European Office Action dated Apr. 4, 2024 in Application No. 22150794.0.

* cited by examiner

*Primary Examiner* — Evans Desrosiers
(74) *Attorney, Agent, or Firm* — SNELL & WILMER L.L.P.

(57) ABSTRACT

An aircraft insert can include a body and a wireless network module configured to create an insert host network for one or more devices to connect to the wireless network module in a host mode, and to connect to an aircraft network in a client mode. The insert can include a LED mounted on or within the body, the LED readable by a Personal Electronic Device (PED) and having insert host network information to allow the PED to connect to the insert wireless network when the wireless network module is in the host mode. The wireless network module can be configured to receive aircraft network information from the PED in the host mode to connect to the aircraft network when in the client mode.

18 Claims, 3 Drawing Sheets

AIRCRAFT INSERT NETWORK CONFIGURATION USING LED

FIELD

This disclosure relates to aircraft inserts (e.g., ovens and other appliances), and more specifically to use the status of Light Emitting Diodes (LED(s)) of the insert for authentication.

BACKGROUND

Aircraft may progressively utilize network connected inserts, e.g., WiFi connectable ovens for cooking meals. However, inserts are intentionally removable and useable on multiple aircraft with different networks and access information, causing networking barriers. Such inserts generally lack a suitable interface for users to input necessary data to connect an insert to a particular network, for example.

Conventional methods and systems have generally been considered satisfactory for their intended purpose. However, there is still a need in the art for improved aircraft insert networking systems. The present disclosure provides a solution for this need.

SUMMARY

An aircraft insert can include a body and a wireless network module configured to create an insert host network for one or more devices to connect to the wireless network module in a host mode, and to connect to an aircraft network in a client mode. The insert can include a (light emitting diode) LED mounted on or within the body, which placed for the status indication to the operator, the LED readable by a Personal Electronic Device (PED) and having insert host network information to allow the PED to connect to the insert host network when the wireless network module is in the host mode. The wireless network module can be configured to receive aircraft network information from the PED through a camera in the host mode to connect to the aircraft network when in the client mode. The LED can be a read and/or written to by a PED. For example, the LED can include one color, or a plurality of colors, and flash a particular pattern or patterns in order to identify itself to the PED.

In certain embodiments, the wireless network module can be configured to be manually set into host mode by a user input using an interface of the insert. In certain embodiments, the wireless network module can be configured to automatically change to host mode when an aircraft network is not connected to and/or found within a preset period of time or connection attempts.

In certain embodiments, in the host mode, the wireless network module can be configured to allow the PED to connect to the wireless network module, then receive aircraft network data from the PED, then switch to the client mode, and then connect to the aircraft network using the aircraft network data provided by the PED. In certain embodiments, the insert can be an oven.

In accordance with at least one aspect of this disclosure, an aircraft galley device can include any suitable embodiment of an insert disclosed above and/or portions thereof. Any suitable aircraft galley device (e.g., an oven) is contemplated herein.

In accordance with at least one aspect of this disclosure, a system can include an insert as disclosed herein (e.g., as described above) and a software app for a PED configured to allow the PED to view and read the LED and/or to communicate with the wireless network module. For example, the insert host network data stored in the insert memory can include insert host network ID (Identifier) or SSID (Service Set Identifier) and insert host network password. The software app can be configured to automatically configure one or more wireless settings of the wireless network module to allow the insert to connect to the aircraft network. The software app can be configured to provide aircraft network ID and aircraft network password to the wireless network module.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
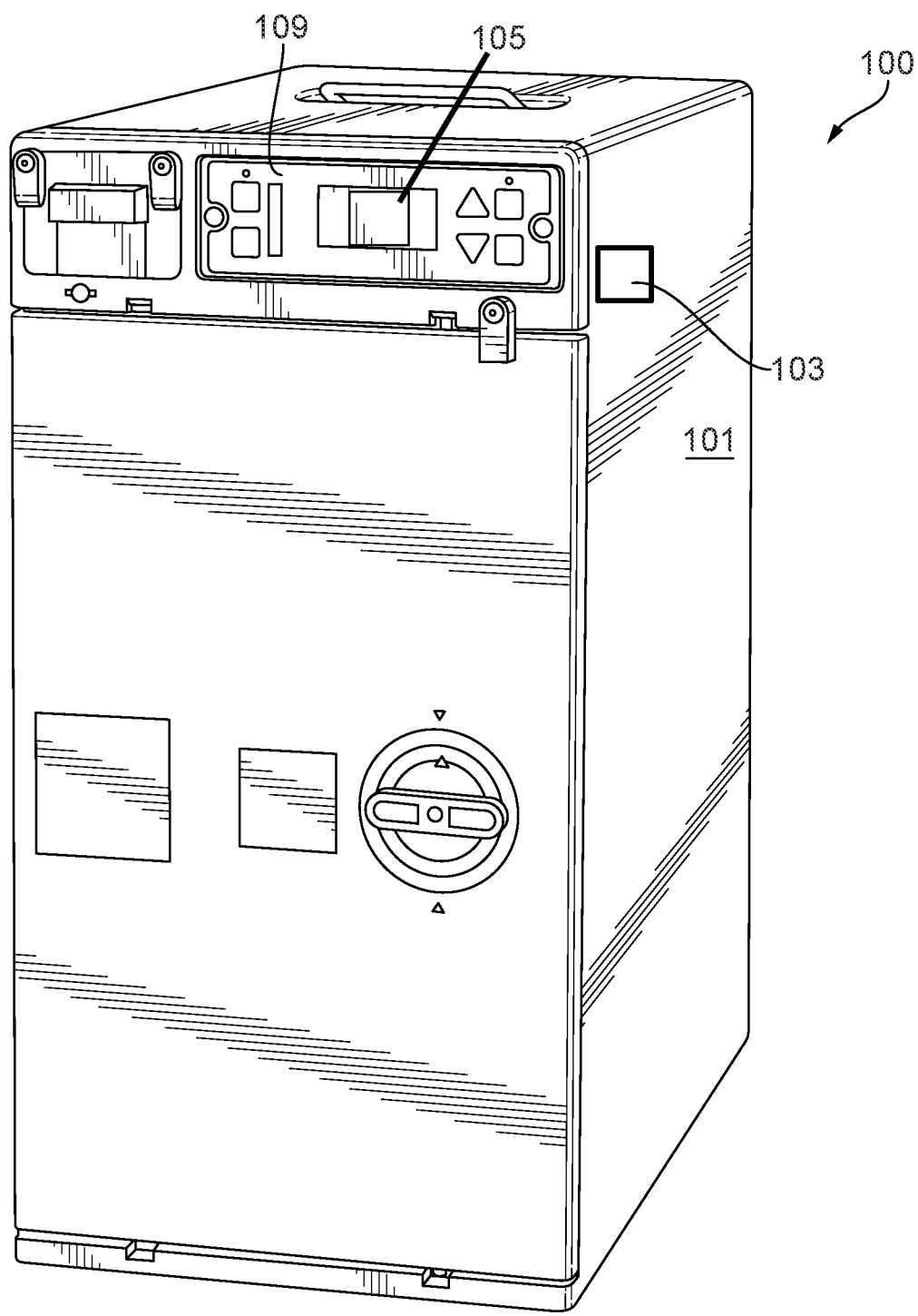
FIG. 1 is an illustrative view of an embodiment of an insert in accordance with this disclosure.

Reference will now be made to the drawings wherein like reference numerals identify similar structural features or aspects of the subject disclosure. For purposes of explanation and illustration, and not limitation, an illustrative view of an embodiment of an insert in accordance with the disclosure is shown in FIG. 1 and is designated generally by reference character 100. Other embodiments and/or aspects of this disclosure are shown in FIGS. 2 and 3.

Figure 2:
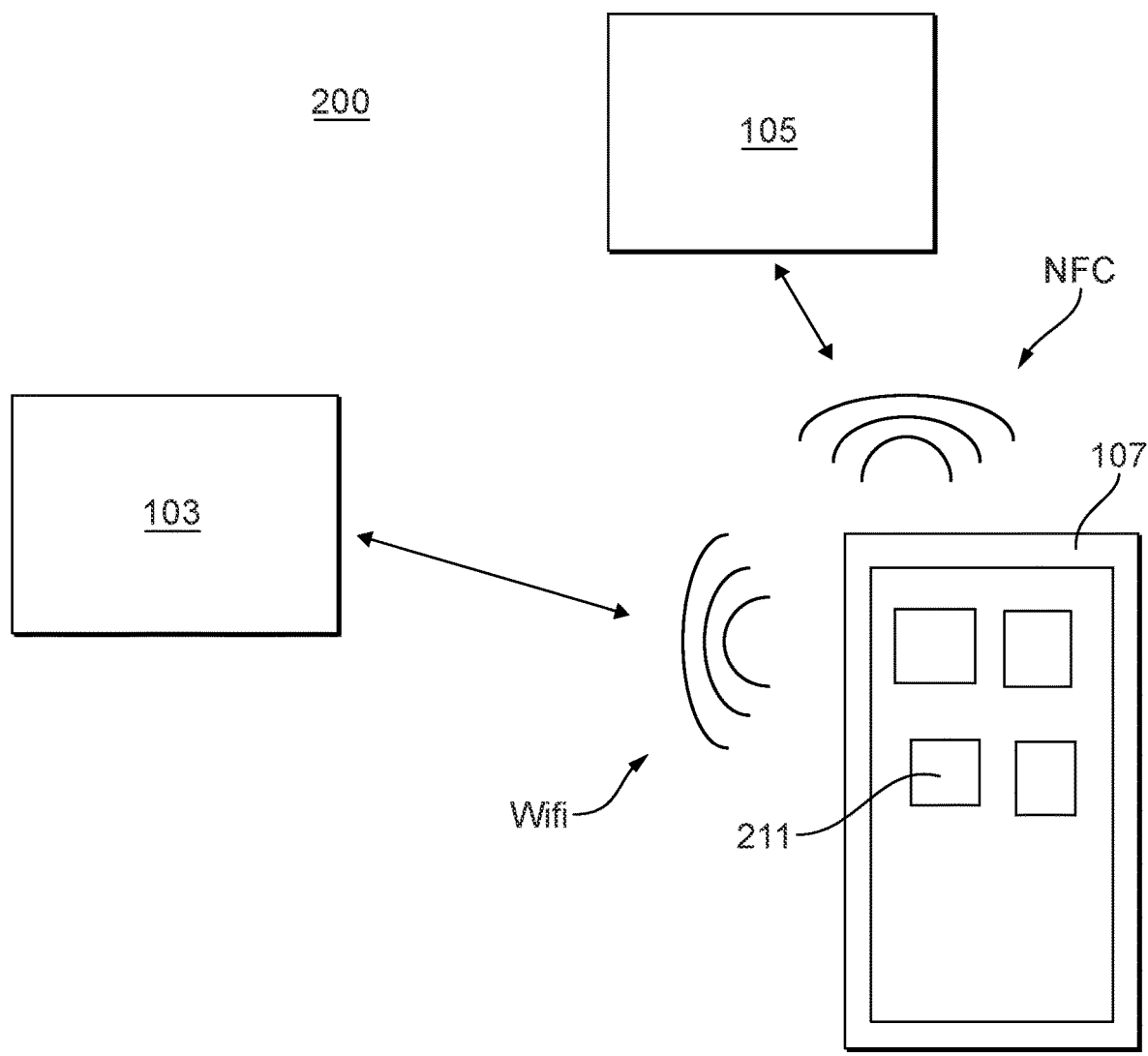
FIG. 2 is an illustrative view of an embodiment of a system in accordance with this disclosure.
Figure 3:
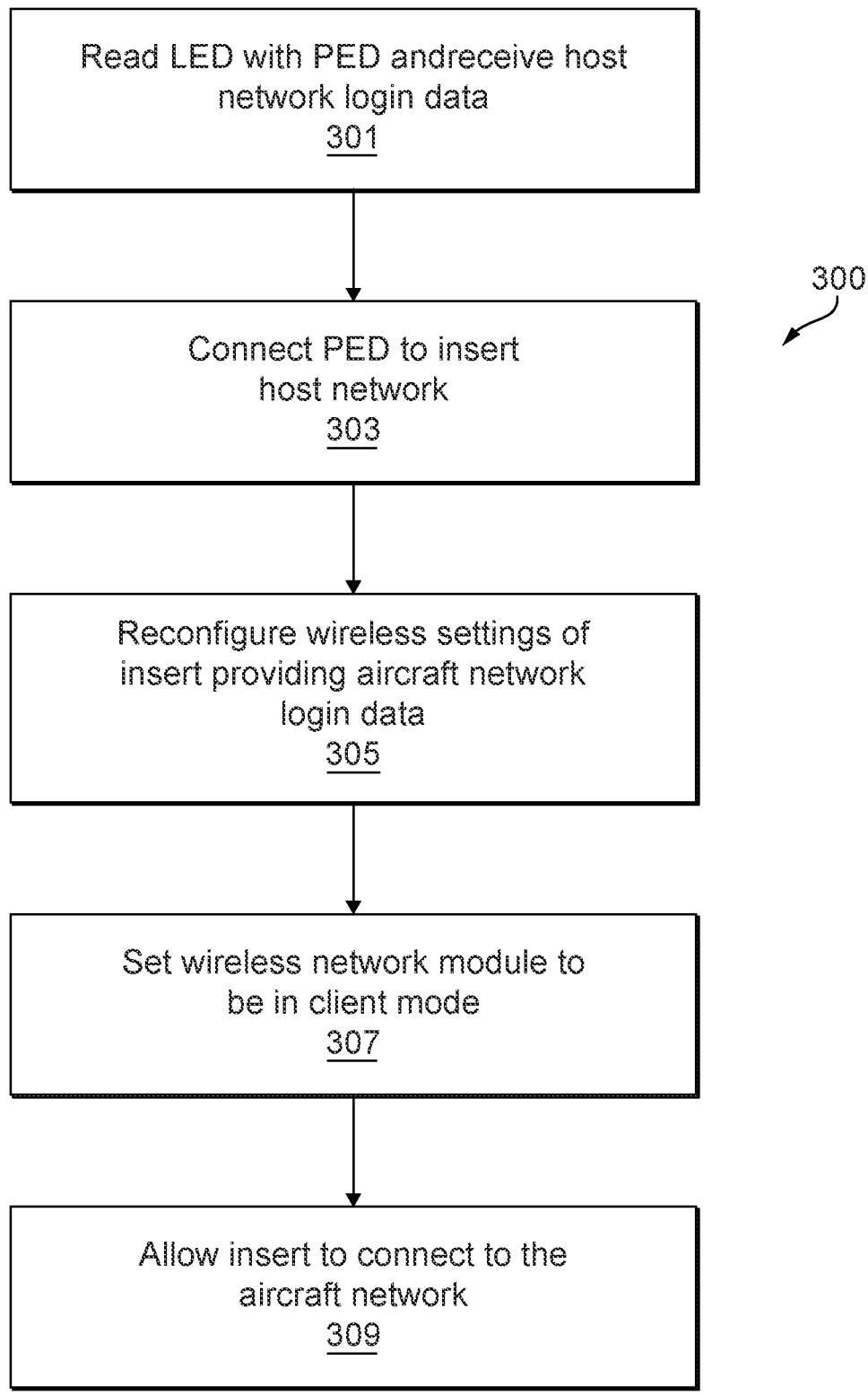
FIG. 3 is a block diagram of an embodiment of a method in accordance with this disclosure.

Referring to FIGS. 1 and 2, an aircraft insert 100 can include a body 101 and a wireless network module 103 configured to create an insert host network for one or more devices (e.g., a Personal Electronic Device such as a smartphone or tablet) to connect to the wireless network module 103 in a host mode. The wireless network module 103 can also be configured to connect to an aircraft network in a client mode (e.g., to communicate with one or more aircraft devices and/or Personal Electronic Devices over the aircraft network). The wireless network module 103 can include any suitable hardware (e.g., a WiFI card) and/or any suitable software module(s) (e.g., suitable WiFi hosting and client firmware) configured to perform any and/or all suitable disclosed method(s)/function(s).

The insert 100 includes an LED 105 which gives a status, such as on/off, heating, filter replace, etc mounted on or within the body 101. The LED 105 can be readable by a Personal Electronic Device (PED) 107 with a camera (e.g., a smart phone, a tablet, or a dedicated device that may be an extension to smart phone or tablet) and to allow the PED 107 to connect to the insert host network when the wireless network module 103 is in the host mode. For example, the LED 105 can include one or multiple LEDs flashing one or multiple colors to signify an identity.

There are multiple ways of passing data through LEDs, including:

a) On/Off blinking

This can either be a synchronous, with a fixed bit time, of pulse width modulated. Depending on the blink speed, the operator will experience a reduced brightness.

b) Brightness change

Here the LED is increased/reduced in brightness depending on the bit state (0, 1) to be communicated.

c) Color change

Since smart devices use cameras it allows the device to use multiple colors of the LED, which can mean differing the use of colors. So instead of picking one color and blinking on/off, we can also pass on bit data by swapping colors per bit state (e.g. blue/green). The added benefit of the color approach is that the status LEDs will change color, clearly indication a different mode (e.g. alternating between blue and green will give cyan). The LED 105 can include any suitable type of data. For example, in certain embodiments, the insert host network data can include insert host network ID (Identifier) or SSID (Service Set Identifier) and insert host network password. In certain embodiments, the insert host network data can include information that can be used to generate a password, for example a seed value or algorithm parameters. For example, in certain embodiments, the password can be calculated from the insert serial number. In certain embodiments, a similar aircraft network tag can be disposed in the galley or other suitable aircraft location and have aircraft network data, such that the PED can use this to obtain aircraft network information to pass on to the insert. In certain embodiments, the insert host network data can be default, constant network data (e.g., preset).

The wireless network module 103 can be configured to receive aircraft network information from the PED 107 in the host mode in order to connect to the aircraft network when the wireless network module 103 is in the client mode. For example, when the wireless network module 103 is in the host mode, the wireless network module 103 can be configured with the aircraft network information from the PED 107 to connect to the aircraft network when switched to the client mode. In certain embodiments, the wireless network module 103 can be configured to be manually set into host mode by a user input using an interface 109 of the insert 100. In certain embodiments, the wireless network module 103 can be configured to automatically change to host mode when an aircraft network is not connected to and/or found within a preset period of time or connection attempts.

When configuring the insert 100, the PED 107 can be first used to read insert host network data from the LED 105, for example. Then, in certain embodiments, in the host mode, the wireless network module 103 can be configured to allow the PED 107 to connect to the wireless network module 107 (by the PED using the insert host network data from the LED 105). Then the wireless network module 103 can receive aircraft network data from the PED 107, then switch to the client mode (e.g., due to a power cycle, or in response to receiving aircraft network data, or due to the PED actively reconfiguring the mode after providing the aircraft network data). The wireless network module 103 can then connect to the aircraft network using the aircraft network data provided by the PED 107. Any other suitable process using the disclosed embodiments is contemplated herein.

In certain embodiments, the insert 100 can be an oven, e.g., as shown. Any other suitable aircraft insert is contemplated herein (e.g., one or more galley devices or any other suitable insertable aircraft device).

In accordance with at least one aspect of this disclosure, an aircraft galley device (e.g., an oven) can be or include any suitable embodiment of an insert (e.g., 100) disclosed above and/or portions thereof. Any suitable aircraft galley device is contemplated herein.

In accordance with at least one aspect of this disclosure, a system 200, e.g., as shown in FIG. 2, can include an insert 100 as disclosed herein (e.g., as described above) and a software app 211 for a PED 107 configured to allow the PED 107 to receive information from the LED 105 and/or to communicate with the wireless network module 103. The software app 211 can include any suitable software module(s) configured to allow for wireless communication with the LED 105 and/or the wireless network module 103.

The software app 211 can be configured to automatically configure one or more wireless settings of the wireless network module 103 to allow the insert 100 to connect to the aircraft network (e.g., via a wifi router on the aircraft). The software app 211 can be configured to provide aircraft network ID and aircraft network password to the wireless network module 103, for example. In certain embodiments, the system 200 can include the PED 107. Any other suitable component(s) for the system 200 is/are contemplated herein.

Referring additionally to FIG. 3, a method 300 can include reading, e.g., a block 301 a LED on insert with a PED and receiving insert host network login data. The method 300 can include connecting to the PED to a host network, e.g., at block 303. The method 300 can include reconfiguring wireless settings of the insert and providing aircraft network login data to the insert (e.g., the wireless network module thereof), e.g., at block 305. The wireless network module of the insert can store the aircraft network data in non-volatile memory. The method 300 can include setting wireless network module to be in client mode, e.g., at block 307. The method 300 can include allowing the insert to connect to the aircraft network, e.g., at block 309. In certain embodiments, the PED can get the network data from either a database or a tag in the galley, for example.

Some embodiments may allow PED (e.g., smart phone) interaction/authentication on inserts without modification to the visual front of the insert or the user interface. Embodiments may require very little manual handling, making it less stressful for the crew in commissioning the inserts. Embodiments may be supported by most modern smartphones and tablets. Embodiments may be applicable to any suitable aircraft equipment.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. An aircraft insert authentication system, comprising:
an appliance body insertable into an aircraft, the appliance body comprising:
  a wireless network module within the appliance body, the wireless network module configured to create an insert host network in a host mode and configured to connect to an aircraft network in a client mode; and
  a user interface having at least one Light Emitting Diode (LED) display; and
a Personal Electronic Device (PED) configured to:
receive data from the at least one LED display, the data of the at least one LED display includes insert host network data of the aircraft insert provided by at least one of blinking of the LED display, a brightness change in the LED display, and/or a color change of the LED display;
connect to the insert host network of the wireless network module using the insert host network data when the wireless network module is in the host mode; and
communicate with the wireless network module to provide aircraft network data to the wireless network module, by means of which the wireless network module connects to the aircraft network in the client mode;
wherein, in the host mode, the wireless network module is configured to allow the PED to connect to the wireless network module, then receive aircraft network data from the PED, then switch to the client mode, and then connect to the aircraft network using the aircraft network data provided by the PED.

2. The aircraft insert authentication system of claim 1, wherein the user interface includes a single LED.

3. The aircraft insert authentication system of claim 1, wherein the user interface includes a plurality of LEDs.

4. The aircraft insert authentication system of claim 1, wherein the LED display includes a single color.

5. The aircraft insert authentication system of claim 1, wherein the LED display includes a plurality of colors.

6. The aircraft insert authentication system of claim 1, wherein the PED is configured to be manually set into client mode by a user input to an interface of the insert.

7. The aircraft insert authentication system of claim 1, wherein the insert is an oven.

8. An aircraft galley insert device, comprising:
an appliance body insertable into an aircraft, the appliance body comprising:
  a wireless network module configured to create an insert host network for one or more devices to connect to the wireless network module in a host mode, and to connect to an aircraft network in a client mode; and
  a Light Emitting Diode (LED) display readable by a Personal Electronic Device (PED) and having insert host network information to allow the PED to:
    receive data from the at least one LED display, the data of the at least one LED display includes insert host network data of the aircraft insert provided by at least one of blinking of the LED display, a brightness change in the LED display, and/or a color change of the LED display;
    connect to the insert host network of the wireless network module using the insert host network data when the wireless network module is in the host mode; and
    communicate with the wireless network module to provide aircraft network data to the wireless network module, by means of which the wireless network module connects to the aircraft network in the client mode;
  wherein, in the host mode, the wireless network module is configured to allow the PED to connect to the wireless network module, then receive the aircraft network data from the PED, then switch to the client mode, and then connect to the aircraft network using the aircraft network data provided by the PED.

9. The aircraft galley insert device of claim 8, wherein the LED display configured to be read by the PED.

10. The aircraft galley insert device of claim 8, wherein the LED display includes a single LED.

11. The aircraft galley insert device of claim 8, wherein the LED display includes a plurality of LEDs.

12. The aircraft galley insert device of claim 8, wherein the LED display includes a single color.

13. The aircraft galley insert device of claim 8, wherein the LED display includes a plurality of colors.

14. The aircraft galley insert device of claim 8, wherein the wireless network module is configured to be manually set into host mode by a user input to an interface of the insert.

15. The aircraft galley insert device of claim 8, wherein the wireless network module is configured to automatically change to host mode when an aircraft network is not connected to and/or found within a preset period of time or connection attempts.

16. The aircraft galley insert device of claim 8, wherein the insert is an oven.

17. A system, comprising:
the aircraft insert authentication system as recited in claim 1; and
a software app for the PED configured to allow the PED to receive information from the LED and/or to communicate with the wireless network module.

18. The system of claim 17, wherein the insert host network data includes insert host network ID (Identifier) or SSID (Service Set Identifier) and insert host network password.

* * * * *